G. W. RINK.

DRAW BAR CARRY IRON.

APPLICATION FILED FEB. 24, 1914.

Reissued Oct. 1, 1918.

14,526.

Witnesses;
J. Adolph Bishop.
M. P. Smith

Inventor;
George W. Rink,
F. W. Cornwall,
Atty.

UNITED STATES PATENT OFFICE.

GEORGE W. RINK, OF JERSEY CITY, NEW JERSEY, ASSIGNOR TO FLORY CARRY IRON COMPANY, OF ST. LOUIS, MISSOURI, A CORPORATION OF DELAWARE.

DRAW-BAR CARRY-IRON.

Specification of Reissued Letters Patent. Reissued Oct. 1, 1918.

14,526.

Original No. 1,070,256, dated August 12, 1913, Serial No. 693,949, filed April 29, 1912. Application for reissue filed February 24, 1914. Serial No. 820,778.

*To all whom it may concern:*

Be it known that I, GEORGE W. RINK, a citizen of the United States, residing at Jersey City, New Jersey, have invented a certain new and useful Improvement in Draw-Bar Carry-Irons, of which the following is a full, clear, and exact description, such as will enable others skilled in the art to which it appertains to make and use the same, reference being had to the accompanying drawings, forming part of this specification, in which—

Figure 1:
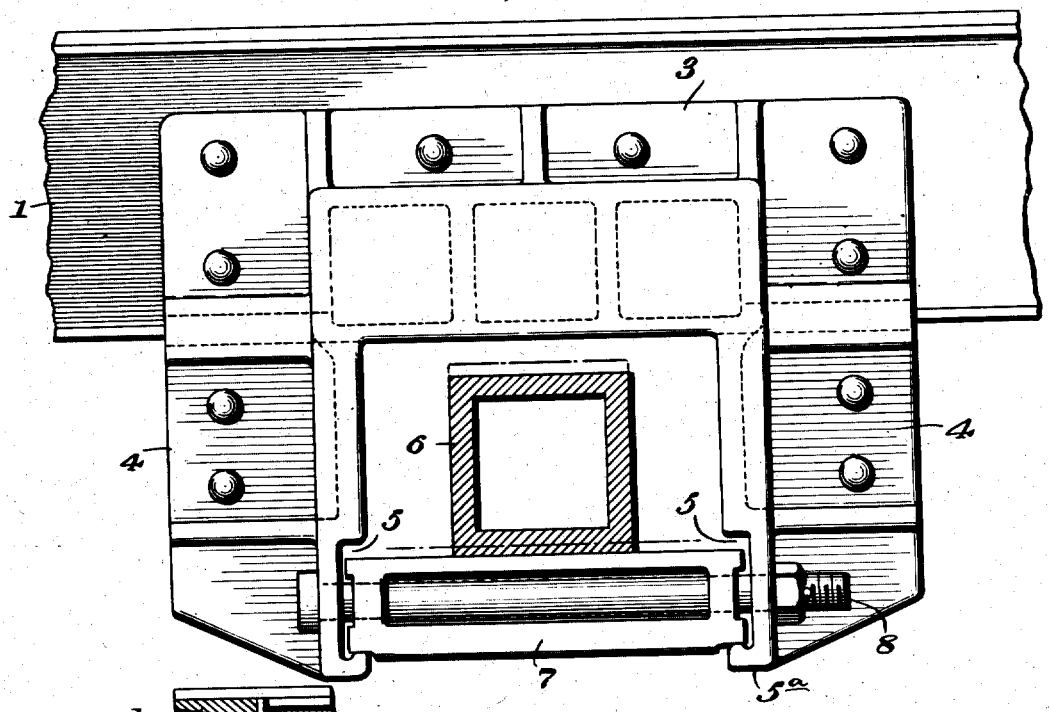
Figure 1 is a front elevational view of my improved carry iron.
Figure 2:
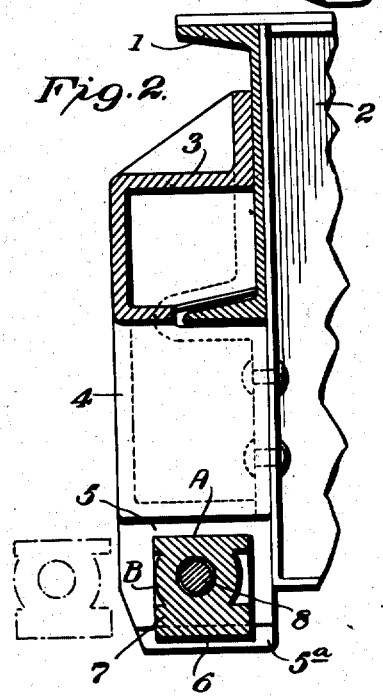
Fig. 2 is a vertical section taken through the center of the parts seen in Fig. 1.

This invention relates to a new and useful improvement in carry irons designed for use in connection with the underframe of railroad cars, the object being to adjustably support the draw bar of the draft rigging whereby the draw bar may be maintained at a given height from the rails, the carry iron being rigidly locked in its different adjusted position.

Another object is to enable the carry iron to be inserted in, or removed from its receiving pocket from in front, without requiring the draw bar to be disconnected from the draft rigging, it being only necessary to support the draw bar and remove the confining bolt of the carry iron to enable the carry iron to be taken out and turned so as to present a supporting face for the draw bar, of different height from the tops of the rail.

A further object of my invention is to provide suitable supports for a draw bar carry iron and to lock said carry iron to said supports against movement in any direction by means of a bolt which passes through the supports and the carry iron, said supports being so constructed as to relieve the attaching bolt of all shearing or bending strains due to the weight and pounding of the draw bar upon the carry iron.

With these objects in view, the invention consists in the construction, arrangement and combination of the several parts, all of which will hereinafter be described, and afterward pointed out in the claims.

Referring by numerals to the accompanying drawings, 1 designates the end sill to which is secured in the usual manner the draft sill 2, and fixed to the front side of said end sill is a dead block or striking plate 3 provided at its sides with depending brackets 4. Formed in the lower inner ends of these brackets are pockets or recesses 5 which are open both front and rear in order that the carry iron can be readily placed in position or removed therefrom through the open ends of said pockets. Flanges $5^a$ are formed integral with the lower ends of the brackets 4 immediately beneath the pockets 5 and serve as supports for the ends of the carry iron. The usual draw bar 6 is shown in section in Fig. 1 in proper position on the carry iron.

Figure 3:
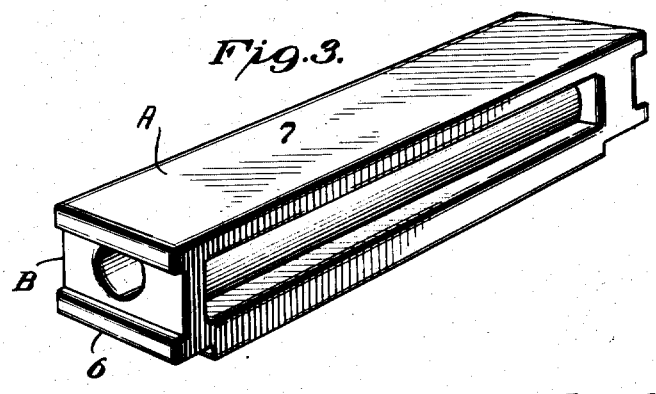
Fig. 3 is a detailed view of the carry iron.

The numeral 7 designates the carry iron which is preferably recessed at its sides for the purpose of lightening the same, said carry iron having a longitudinal opening entirely therethrough, which opening is the same distance from the faces A, B and C of the carry iron, the faces C being formed by reducing the ends of the carry iron as shown in Figs. 1 and 3.

The numeral 8 designates a bolt which is designed to pass through openings in the lower ends of the brackets and also through the carry iron, said bolt having sufficient play in the opening in the carry iron to compensate for the irregularities of manufacture.

In assembling the parts, the carry iron is introduced on to the flanges $5^a$ which form the bottom walls of the pockets, and the bolt 8 passes therethrough, said bolt being held in position by means of a nut or cotter pin in a well known manner. When it is desired to increase the height of the draw bar from the rails, the carry iron may be removed without taking out the draw bar and inverted so as to present the faces C upwardly as shown by dotted lines in Fig. 1. A third adjustment can be effected by turning the carry iron on its sides, so that the faces B will rest upon the lugs $5^a$. When the carry iron is in position, it is held rigid against movement in all directions and forms substantially a fixed part of the underframe of the car.

By my improved construction and particularly the formation of pockets or recesses in the brackets depending from the dead block, and by forming said pockets open at the front and rear, it is possible to easily and quickly insert or remove the carry iron without necessitating the removal of the draw bar from the draft rigging, and this particular feature is very desirable when it is necessary to make repairs or when it is desired to adjust the position of the carry iron to vary the height at which the draw bar is carried.

The ends of the carry iron rest upon the flanges 5ª at the lower ends of the supports, and by virtue of such construction and arrangement the through bolt 8 which attaches the carry iron to the supports and locks said carry iron against movement in any direction, is relieved of all shearing or bending strains which result from the weight and pounding of the supported draw bar upon the carry iron.

As shown in Fig. 1, I prefer to cut away the lugs 5ª near the inner faces of the pockets so as to provide supporting faces for the carry iron somewhat removed from the inner faces of the pockets. In this way I avoid any accumulation of dirt or cinders from the corners of the pockets which might prevent the proper positioning of the carry iron.

I claim:

1. The combination of a car underframe dead block having depending brackets formed with pockets open front and rear, a carry iron which is introduced into or removed from said pockets from in front or rear, said carry iron being provided with a longitudinal opening, and a bolt passing through openings in the dead block and the opening in said carry iron, whereby the carry iron is fixedly held against movement in all directions.

2. The combination of a car underframe dead block having downwardly projecting brackets, the inner faces of which are provided with inwardly presented shelves, a carry iron which is introduced into or removed from position between the brackets from in front or rear, the ends of which carry iron are supported upon the shelves, and means seated in the brackets and passing through the carry iron for fixedly holding the latter in position on said shelves.

3. The combination with supports having inwardly projecting flanges near their lower ends, of a carry iron, the ends of which are adapted to rest upon the flanges of the support, and a bolt seated in the supports and passing lengthwise through the carry iron.

4. The combination with supports, of a carry iron adapted to be positioned between or removed from the supports from in front or rear, a bolt seated in the supports and passing lengthwise through the carry iron, and means on the supports for supporting the carry iron independently of the bolt and which independent supporting means relieves the bolt of all shearing or bending strains imparted thereto by the weight and pounding of the supported draw bar upon the carry iron.

GEO. W. RINK.

Witnesses:
THOMAS B. PULLIS,
HARRY COWEN.